(12) United States Patent
Horiba

(10) Patent No.: US 12,000,713 B2
(45) Date of Patent: Jun. 4, 2024

(54) TIGHTENING MACHINE

(71) Applicant: SANYO MACHINE WORKS, LTD., Aichi (JP)

(72) Inventor: Yusuke Horiba, Aichi (JP)

(73) Assignee: SANYO MACHINE WORKS, LTD., Aichi (JP)

( * ) Notice: Subject to any disclaimer, the term of this patent is extended or adjusted under 35 U.S.C. 154(b) by 458 days.

(21) Appl. No.: 17/607,928

(22) PCT Filed: May 14, 2021

(86) PCT No.: PCT/JP2021/018410
§ 371 (c)(1),
(2) Date: Nov. 1, 2021

(87) PCT Pub. No.: WO2022/239229
PCT Pub. Date: Nov. 17, 2022

(65) Prior Publication Data
US 2023/0191571 A1    Jun. 22, 2023

(51) Int. Cl.
*G01D 5/14* (2006.01)
*B25B 21/02* (2006.01)

(52) U.S. Cl.
CPC ............... *G01D 5/14* (2013.01); *B25B 21/02* (2013.01)

(58) Field of Classification Search
CPC ............ B25B 21/02; B25B 23/14; G01D 5/14
See application file for complete search history.

(56) References Cited

U.S. PATENT DOCUMENTS 10,710,223 B2 * 7/2020 Rosani ................ B23D 29/002
10,803,499 B1 * 10/2020 Davis ................. G06Q 10/1097
(Continued)

FOREIGN PATENT DOCUMENTS

JP        06-339867        12/1994
JP        07-080778         3/1995
(Continued)

OTHER PUBLICATIONS

International Search Report issued Jul. 27, 2021 in International (PCT) Application No. PCT/JP2021/018410.
(Continued)

*Primary Examiner* — Jennifer Bahls
(74) *Attorney, Agent, or Firm* — Wenderoth, Lind & Ponack, L.L.P.

(57) ABSTRACT

A tightening machine of the present invention includes: a mobile receiving portion 20 that receives a positioning signal (GNSS signal) from positioning means (GNSS satellite Sa); a geomagnetic sensor 30 that detects a direction of a socket portion 41 with the mobile receiving portion 20 as a starting point; and a control portion that receives the positioning signal received by the mobile receiving portion 20 and a positioning signal received by a fixed receiving portion 22 at a fixed position away from a torque wrench 110 serving as the tightening machine, corrects a three-dimensional position of the mobile receiving portion 20 based on the positioning signals, and calculates a three-dimensional socket position of the socket portion 41 of the torque wrench 110 serving as the tightening machine based on a result of the correction and the direction of the socket portion 41 detected by the geomagnetic sensor 30.

20 Claims, 3 Drawing Sheets

(56) References Cited

U.S. PATENT DOCUMENTS

| | | | |
|---|---|---|---|
| 2012/0006161 A1* | 1/2012 | Chen | G01L 5/24 |
| | | | 81/479 |
| 2013/0324156 A1 | 12/2013 | Wallgren | |
| 2017/0197302 A1 | 7/2017 | Kobayashi | |
| 2019/0217455 A1 | 7/2019 | Kobayashi | |

FOREIGN PATENT DOCUMENTS

| | | |
|---|---|---|
| JP | 2013-188858 | 9/2013 |
| JP | 2015-229210 | 12/2015 |
| JP | 6071146 | 2/2017 |
| JP | 6350938 | 7/2018 |

OTHER PUBLICATIONS

International Preliminary Report on Patentability and Written Opinion of the International Searching Authority issued Nov. 14, 2023 in International (PCT) Application No. PCT/JP2021/018410.
"Hybrid Torque Wrench HTW Series" (search date: Apr. 30, 2021): http://www.smartautomation.jp/cetop/htw/, with English translation.

* cited by examiner

TIGHTENING MACHINE

TECHNICAL FIELD

The present invention relates to a tightening machine such as a torque wrench or a nut runner, and more particularly, to a tightening machine capable of detecting a position of a socket portion fitted to a bolt or a nut.

BACKGROUND ART

A torque wrench as a tightening machine that fastens or loosens a bolt or a nut includes a socket portion fitted to the bolt or the nut, and a main body portion (arm portion) linearly extending from the socket portion. An operator supports the main body portion by hand, fits the socket portion to the bolt or the nut, and turns the main body portion to fasten or loosen the bolt or the nut.

In recent years, from the viewpoint of fool-proofing and traceability, a digital torque wrench has become widespread, which is capable of displaying and recording a tightening torque value at the time of tightening a bolt or a nut, a target tightening torque range value (lower limit value and upper limit value), the number of times of tightening, a tightening date, and the like (see Non-Patent Literature 1). By managing the tightening torque value and the like read from the digital torque wrench wirelessly or by wire to a personal computer side by the use of spreadsheet software or a dedicated application, it is possible to provide tightening support functions such as optimization of a tightening torque of a bolt or a nut, prevention of omission of bolt or nut tightening, and prevention of double tightening.

CITATIONS LIST

Patent Literature

Patent Literature 1: JP H06-339867 A
Patent Literature 2: JP H07-080778 A
Patent Literature 3: JP 6071146 B2

Non-Patent Literature

Non-Patent Literature 1: Internet site "Hybrid Torque Wrench HTW Series" (search date: Apr. 30, 2021): http://www.smartautomation.jp/cetop/htw/

SUMMARY OF INVENTION

Technical Problems

It is well known to manage a tightening torque value of a bolt or a nut, and the like by personal computer software (See Patent Literatures 1 and 2). There is also proposed a positioning system capable of detecting a position (three-dimensional position) of a movable body (power wrench 12) in an assembly line of a vehicle body (Patent Literature 3). In this positioning system, the position of the power wrench is detected by a communication module, and the position is compared with a position of a bolt to be fastened and fastening data applied to the bolt to evaluate whether or not the power wrench is performing allowable fastening operation at each bolt. However, since detection accuracy of the position of the power wrench is not sufficient, malfunction might occur.

Therefore, an object of the present invention is to provide a tightening machine capable of detecting a position of a socket portion with sufficient detection accuracy.

Solutions to Problems

In order to solve the above problem, a tightening machine according to the present invention is a tightening machine that rotates a socket portion fitted to a bolt or a nut to fasten or loosen the bolt or the nut, the tightening machine including: a mobile receiving portion that receives a positioning signal from positioning means; a geomagnetic sensor that detects a direction of the socket portion with the mobile receiving portion as a starting point; and a control portion that receives a positioning signal received by the mobile receiving portion and a positioning signal received by a fixed receiving portion at a fixed position away from the tightening machine, corrects a three-dimensional position of the mobile receiving portion based on the positioning signals, and calculates a three-dimensional socket position of the socket portion of the tightening machine based on a result of the correction and the direction of the socket portion detected by the geomagnetic sensor.

The tightening machine of the present invention is a tightening machine that rotates a socket portion fitted to a bolt or a nut to fasten or loosen the bolt or the nut, the tightening machine including: first and second mobile receiving portions that are disposed at predetermined intervals in a longitudinal direction of a main body portion coupled to the socket portion and receive a positioning signal from positioning means; and a control portion that receives positioning signals received by the first and second mobile receiving portions and a positioning signal received by a fixed receiving portion at a fixed position away from the tightening machine, corrects three-dimensional positions of the first and second mobile receiving portions based on the positioning signals, and calculates a three-dimensional socket position of the socket portion of the tightening machine based on a result of the correction.

Advantageous Effects of Invention

According to the present invention, since the three-dimensional socket position of the socket portion of the tightening machine can be detected with sufficient detection accuracy, it is possible to record a position of a bolt or a nut to be fastened or loosened and its tightening torque value or the like so as to be accurately associated with each other.

DESCRIPTION OF EMBODIMENT

Figure 1:
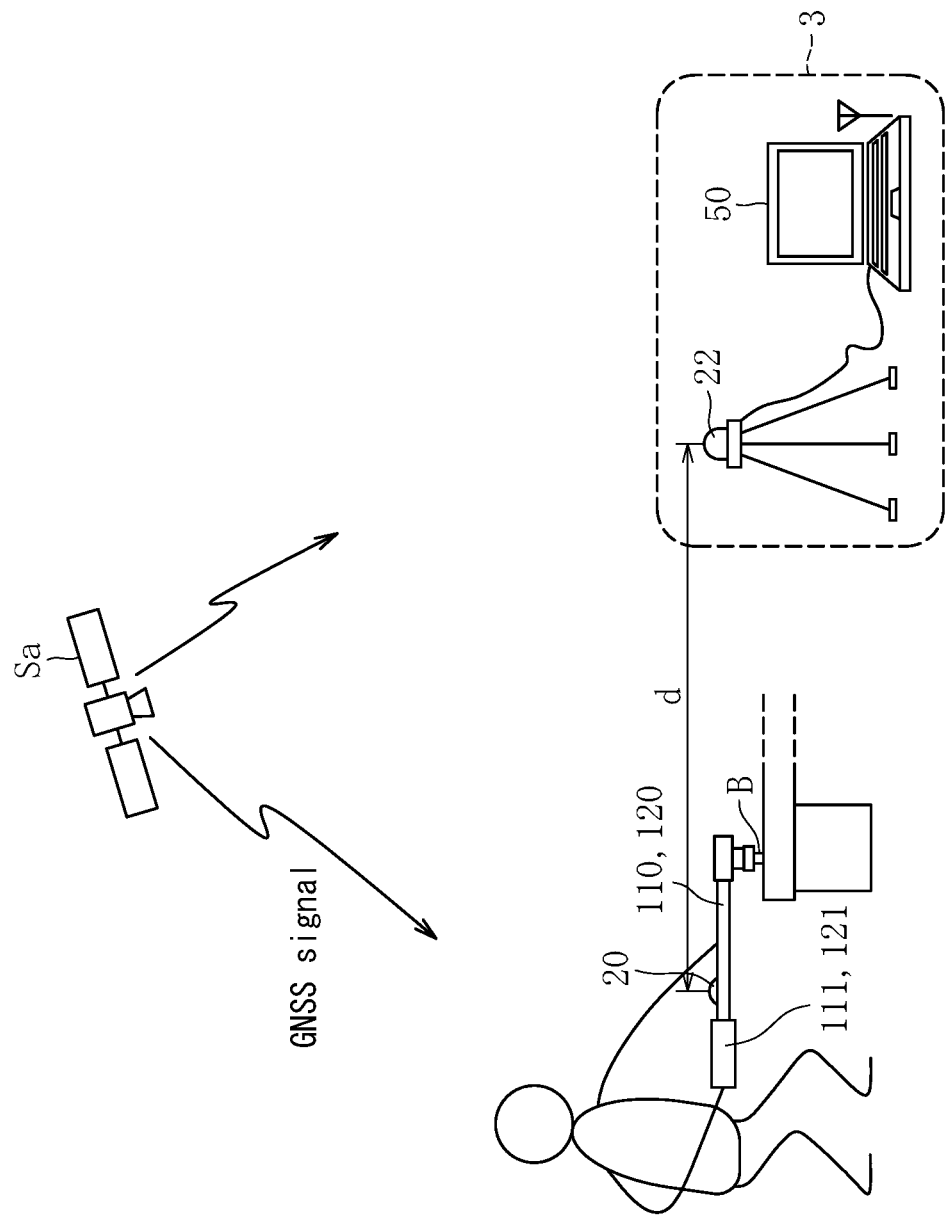
FIG. 1 is a schematic view of bolt tightening work using a torque wrench according to an embodiment of the present invention.
Figure 2A:
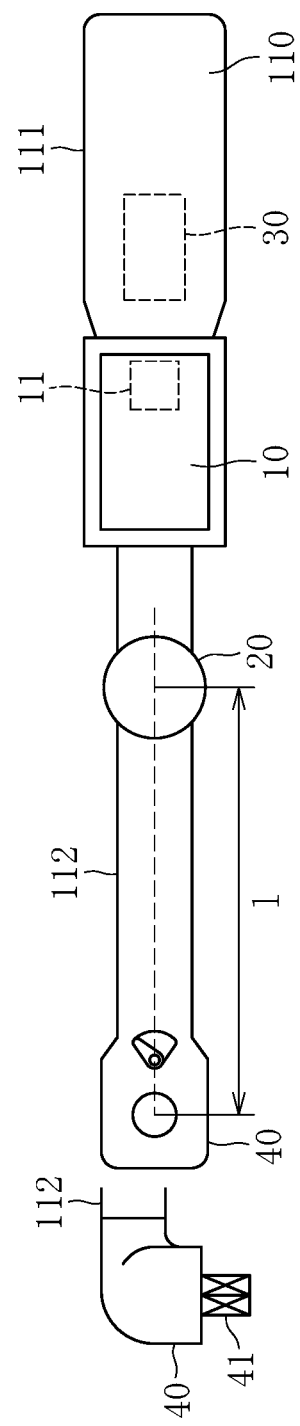
FIG. 2A is a schematic view of a first torque wrench according to the embodiment of the present invention.
Figure 2B:
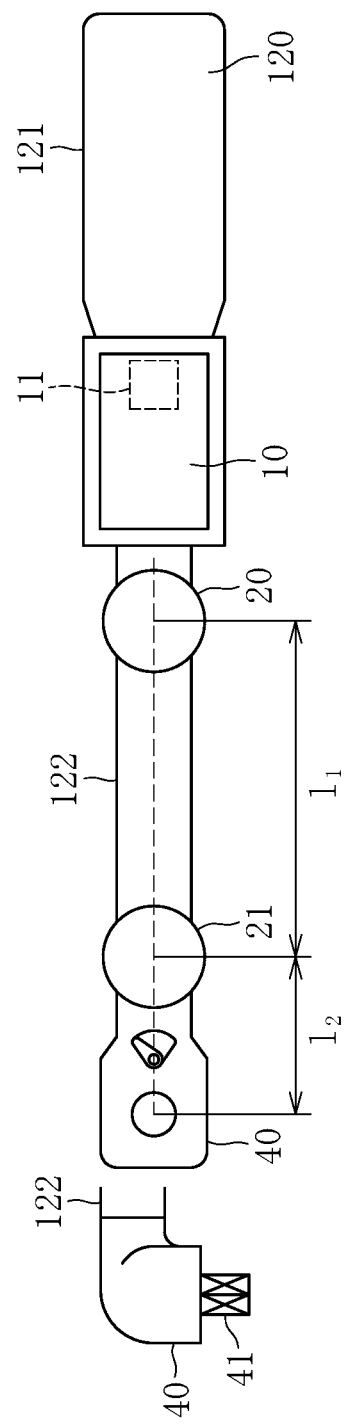
FIG. 2B is a schematic view of a second torque wrench according to the embodiment of the present invention.

Hereinafter, a first torque wrench 110 and a second torque wrench 120 as tightening machines according to an embodiment of the present invention will be described with reference to the drawings. FIG. 1 illustrates a state where tightening work of a bolt B is performed using the torque wrench 110, 120. As shown in FIGS. 2A and 2B, the torque wrenches 110 and 120 have grip portions 111 and 121 and main body portions 112 and 122, respectively, a head portion 40, and a socket portion 41.

(•First Torque Wrench)

The first torque wrench 110 of FIG. 2A has a mobile receiving portion 20 on a proximal end side of the laterally extending main body portion 112. The mobile receiving portion 20 is for receiving a positioning signal (GNSS signal) from a positioning satellite (GNSS satellite Sa) as positioning means, and a distance to the head portion 40 or the socket portion 41 at a distal end of the main body portion 112 is set to a predetermined length 1.

On the other hand, a geomagnetic sensor 30 is built in the grip portion 111. The geomagnetic sensor 30 is a three-axis geomagnetic sensor, and is capable of detecting a direction of the head portion 40 or the socket portion 41 with the mobile receiving portion 20 as a starting point. Here, the "direction" includes an azimuth and an elevation angle.

Specifically, a magneto-resistive (MR) element, a magneto-impedance (MI) element, a Hall element, or the like can be used as the three-axis geomagnetic sensor 30. In addition, in order to correct a detection result obtained by the three-axis geomagnetic sensor 30, an acceleration sensor (gravity sensor) or an angular velocity sensor (gyro sensor) may be additionally built in the grip portion 111.

Only one of the acceleration sensor and the angular velocity sensor or both of them may be built in. The acceleration sensor is allowed to adopt a so-called capacitance detection method, a piezoresistive method, a heat detection method, or the like, and a measurement method therefor is not particularly limited. Similarly, the angular velocity sensor is allowed to employ a so-called vibration method using a piezoelectric vibrator or a silicon vibrator.

In addition, a display portion 10 is disposed at an intermediate position between the mobile receiving portion 20 and the grip portion 111. The display portion 10 has a control portion 11 to be described later built therein so that a tightening torque value and the like can be displayed on the display portion 10 by the action of the control portion 11.

(•Second Torque Wrench)

The second torque wrench 120 in FIG. 2B has a first mobile receiving portion 20 on a proximal end side of the main body portion 122 and a second mobile receiving portion 21 on a distal end side. The first and second mobile receiving portions 20 and 21 are for receiving the GNSS signal from the GNSS satellite, and an interval $l_1$ between the mobile receiving portions 20 and 21 is set to a constant length along a longitudinal direction of the main body portion 122. Further, a distance from the second mobile receiving portion 21 to the head portion 40 or the socket portion 41 is set to a predetermined length 12 on a longitudinal extension line of the main body portion 122.

(•Calculation of Three-Dimensional Socket Position)

In FIG. 1, a fixed receiving portion 22 that receives the GNSS signal from the GNSS satellite Sa is disposed at a fixed position away, by a distance d, from the mobile receiving portion 20 of the torque wrench 110, 120 supported by an operator. The fixed receiving portion 22 is connected to a calculator 50 configured by a personal computer or the like, and the calculator 50 records the position of the socket portion 41 of the torque wrench 110, 120. The fixed receiving portion 22 and the calculator 50 constitute a reference station 3.

The GNSS signal received by the fixed receiving portion 22 is transmitted to the control portion 11 of the first torque wrench 110 in FIG. 2A. The control portion 11 corrects a three-dimensional position of the mobile receiving portion 20 based on the GNSS signals of both the fixed receiving portion 22 and the mobile receiving portion 20.

Then, in the first torque wrench 110 of FIG. 2A, a three-dimensional socket position of the socket portion 41 of the first torque wrench 110 is calculated by the control portion 11 based on the correction result and a direction of the socket portion 41 with the mobile receiving portion 20 as a starting point, the direction being detected by the geomagnetic sensor 30. The calculated three-dimensional socket position is displayed on the display portion 10 and transmitted to the calculator 50 by a wireless LAN or the like.

On the other hand, also in the second torque wrench 120 in FIG. 2B, the GNSS signal received by the fixed receiving portion 22 is transmitted to the control portion 11 of the torque wrench 110 in FIG. 2B in the same manner as described above. The control portion 11 corrects the three-dimensional positions of the mobile receiving portions 20 and 21 based on the GNSS signals of the fixed receiving portion 22 and both the first and second mobile receiving portions 20 and 21.

The control portion 11 calculates a three-dimensional socket position of the socket portion 41 of the torque wrench 110, 120 based on the correction result. The calculated three-dimensional socket position is displayed on the display portion 10 and transmitted to the calculator 50 by the wireless LAN.

Since the three-dimensional socket position of the socket portion 41 of the torque wrench 110, 120 is calculated in this manner, a position of a bolt or a nut to be fastened or loosened and a tightening torque value thereof can be recorded in the calculator 50 in association with each other.

Specifically, a three-dimensional work position of a plurality of bolts or nuts to be fastened or loosened is stored in a nonvolatile memory (first storage portion) such as a flash memory built in the torque wrench 110, 120, and the control portion 11 collates the three-dimensional work position with the three-dimensional socket position to enable the bolt or the nut fitted to the socket portion 41 to be identified as a fastening or loosening target.

The control portion 11 compares a specified torque value displayed on the display portion 10 with a fastening torque value of the bolt or the nut that has been fastened, and determines whether the fastening torque value is appropriate or not. When the fastening torque value is excessive or insufficient, it is possible to call the operator's attention by causing the display portion 10 to display with blinking, causing the grip portion 111, 121 to generate vibrations, or causing a built-in speaker to emit a warning sound.

In addition, the three-dimensional work completion position of the bolt or nut that has been fastened is stored in a non-volatile memory (second storage portion) such as a flash memory built in the torque wrench 110, 120, and the control portion 11 collates the three-dimensional work completion position with the three-dimensional socket position, thereby preventing double tightening of the bolt or the nut. Specifically, when double tightening of the bolt or the nut occurs, it is possible to call the operator's attention to double tightening by causing the display portion 10 to display a warning of the double tightening with blinking, causing the grip portion 111, 121 to generate vibrations, or causing the built-in speaker to emit a warning sound.

In addition, a sound generator (a speaker, a buzzer, etc.) operated by the control portion 11 may be provided at an arbitrary position of the main body portion 112, 122, and a direction and a distance of a three-dimensional work position of a bolt or a nut to be fastened or loosened next may be suggested by at least two of an interval, a magnitude (sound pressure), and a frequency of intermittent sounds emitted from the sound generator. For example, when the operator slowly swings the main body portion 112, 122 of the torque wrench 110, 120 in a left-right direction while holding the main body portion horizontally, a sound pressure of the emitted sound increases as the direction of the head portion 40 at the front end of the main body portion 112, 122 approaches a direction of the bolt or the nut to be fastened or loosened next.

Then, as the head portion 40 approaches the bolt or the nut, the interval of the emitted sound is shortened, and when the head portion 40 comes closest to the bolt or the nut, the emitted sound becomes a continuous sound. This enables the operator to easily grasp the three-dimensional work position of the bolt or the nut to be fastened or loosened next, so that the work efficiency can be enhanced. In addition, the direction and the distance of the three-dimensional work position of the bolt or the nut to be fastened or loosened next may be indicated by an arrow and a number (in a unit of meter) displayed on the display portion 10. In addition, display by the arrow and the number (in a unit of meter) and the above-described emitted sound may be used in combination.

Similarly, a vibration generator (a vibrator, a vibration motor, etc.) operated by the control portion 11 may be provided at an arbitrary position of the main body portion 112, 122, and the direction and the distance of the three-dimensional work position of the bolt or the nut to be fastened or loosened next may be suggested by at least two of an interval, a magnitude (amplitude), and a frequency of intermittent vibrations generated from the vibration generator. For example, when the operator slowly swings the main body portion 112, 122 of the torque wrench 110, 120 in the left-right direction while holding the main body portion horizontally, the vibration of the vibration generator increases as the direction of the head portion 40 at the front end of the main body portion 112, 122 approaches the direction of the bolt or the nut to be fastened or loosened next.

Then, as the head portion 40 approaches the bolt or the nut, the interval of the intermittent vibration becomes shorter, and when the head portion 40 comes closest to the bolt or the nut, the intermittent vibration becomes a continuous vibration. This enables the operator to easily grasp the three-dimensional work position of the bolt or the nut to be fastened or loosened next, so that the work efficiency can be enhanced. In addition, the above-described intermittent vibration may be used while displaying an arrow and a number (in a unit of meter) indicating the direction and the distance of the three-dimensional work position of the bolt or the nut to be fastened or loosened next on the display portion 10.

Although the embodiment of the present invention has been described in the foregoing, the present invention is not limited to the above-described embodiment, and various modifications can be made. For example, the present invention is not limited to a torque wrench, and can be applied also to a nut runner (mainly a battery-built-in electric nut runner) and a power wrench. Furthermore, as the positioning means, in addition to the GNSS satellite Sa, a plurality of wireless LAN access points or the like can be used in a case of indoor use. In addition, the arrangement positions of the mobile receiving portion 20, 21 and the geomagnetic sensor 30 are merely examples, and are not limited to the illustrated positions, and the portion and the sensor can be arranged at any position in a longitudinal direction of the torque wrench 110, 120.

REFERENCE SIGNS LIST

3 Reference station
10 Display portion
11 Control portion
20 Mobile receiving portion (first mobile receiving portion)
21 Mobile receiving portion (second mobile receiving portion)
22 Fixed receiving portion
30 Geomagnetic sensor
40 Head portion
41 Socket portion
50 Calculator
110 First torque wrench (tightening machine)
120 Second torque wrench (tightening machine)
111, 121 Grip portion
112, 122 Main body portion
B Bolt
Sa GNSS satellite (positioning means)

The invention claimed is:

1. A tightening machine that rotates a socket portion fitted to a bolt or a nut to fasten or loosen the bolt or the nut, the tightening machine comprising:
   a mobile receiving portion that receives a positioning signal from positioning means;
   a geomagnetic sensor that detects a direction of the socket portion with the mobile receiving portion as a starting point; and
   a control portion that receives a positioning signal received by the mobile receiving portion and a positioning signal received by a fixed receiving portion at a fixed position away from the tightening machine, corrects a three-dimensional position of the mobile receiving portion based on the positioning signals, and calculates a three-dimensional socket position of the socket portion of the tightening machine based on a result of the correction and the direction of the socket portion detected by the geomagnetic sensor.

2. The tightening machine according to claim 1, further comprising at least one of an acceleration sensor and an angular velocity sensor in addition to the geomagnetic sensor,
   wherein a detection result of the geomagnetic sensor is corrected by the acceleration sensor or the angular velocity sensor.

3. The tightening machine according to claim 2, wherein the positioning means is a GNSS satellite, and the positioning signal is a GNSS signal.

4. The tightening machine according to claim 3, further comprising a first storage portion capable of storing three-dimensional work positions of a plurality of the bolts or the nuts to be fastened or loosened,
   wherein the control portion collates the three-dimensional work positions with the three-dimensional socket position to enable the bolt or the nut fitted to the socket portion to be identified as a fastening or loosening target.

5. The tightening machine according to claim 2, further comprising a first storage portion capable of storing three-dimensional work positions of a plurality of the bolts or the nuts to be fastened or loosened,
   wherein the control portion collates the three-dimensional work positions with the three-dimensional socket position to enable the bolt or the nut fitted to the socket portion to be identified as a fastening or loosening target.

6. The tightening machine according to claim 1, wherein the positioning means is a GNSS satellite, and the positioning signal is a GNSS signal.

7. The tightening machine according to claim 6, further comprising a first storage portion capable of storing three-dimensional work positions of a plurality of the bolts or the nuts to be fastened or loosened,
wherein the control portion collates the three-dimensional work positions with the three- dimensional socket position to enable the bolt or the nut fitted to the socket portion to be identified as a fastening or loosening target.

8. The tightening machine according to claim 1, further comprising a first storage portion capable of storing three-dimensional work positions of a plurality of the bolts or the nuts to be fastened or loosened,
wherein the control portion collates the three-dimensional work positions with the three- dimensional socket position to enable the bolt or the nut fitted to the socket portion to be identified as a fastening or loosening target.

9. The tightening machine according to claim 8, further comprising a display portion that displays the three-dimensional work position, the display portion being configured to display a specified torque value of the bolt or the nut in addition to the three-dimensional work position.

10. The tightening machine according to claim 9, wherein the control portion compares the specified torque value with a fastening torque value of the bolt or the nut that has been fastened, and determines whether or not the fastening torque value is appropriate.

11. The tightening machine according to claim 10, wherein the display portion is configured to display a result of the determination.

12. The tightening machine according to claim 9, wherein the display portion is configured to display a three-dimensional work position of the bolt or the nut to be fastened or loosened next.

13. The tightening machine according to claim 9, wherein the display portion is configured to display, by an arrow and a number, a direction and a distance of a three-dimensional work position of the bolt or the nut to be fastened or loosened next.

14. The tightening machine according to claim 9, further comprising a sound generator controlled by the control portion, the sound generator being configured to suggest a direction and a distance of a three-dimensional work position of the bolt or the nut to be fastened or loosened next by at least two of an interval, a sound pressure, and a frequency of intermittent sounds emitted from the sound generator.

15. The tightening machine according to claim 9, further comprising a vibration generator controlled by the control portion, the vibration generator being configured to suggest a direction and a distance of a three-dimensional work position of the bolt or the nut to be fastened or loosened next by at least two of an interval, an amplitude, and a frequency of intermittent vibrations generated from the vibration generator.

16. The tightening machine according to claim 9, further comprising a second storage portion that stores a three-dimensional work completion position of the bolt or the nut that has been fastened,
wherein the control portion collates the three-dimensional work completion position with the three-dimensional socket position to enable the display portion to display double tightening of the bolt or the nut.

17. A tightening machine that rotates a socket portion fitted to a bolt or a nut to fasten or loosen the bolt or the nut, the tightening machine comprising:
first and second mobile receiving portions that are disposed at predetermined intervals in a longitudinal direction of a main body portion coupled to the socket portion and receive a positioning signal from positioning means; and
a control portion that receives positioning signals received by the first and second mobile receiving portions and a positioning signal received by a fixed receiving portion at a fixed position away from the tightening machine, corrects three-dimensional positions of the first and second mobile receiving portions based on the positioning signals, and calculates a three-dimensional socket position of the socket portion of the tightening machine based on a result of the correction.

18. The tightening machine according to claim 17, wherein the positioning means is a GNSS satellite, and the positioning signal is a GNSS signal.

19. The tightening machine according to claim 18, further comprising a first storage portion capable of storing three-dimensional work positions of a plurality of the bolts or the nuts to be fastened or loosened,
wherein the control portion collates the three-dimensional work positions with the three-dimensional socket position to enable the bolt or the nut fitted to the socket portion to be identified as a fastening or loosening target.

20. The tightening machine according to claim 17, further comprising a first storage portion capable of storing three-dimensional work positions of a plurality of the bolts or the nuts to be fastened or loosened,
wherein the control portion collates the three-dimensional work positions with the three-dimensional socket position to enable the bolt or the nut fitted to the socket portion to be identified as a fastening or loosening target.

* * * * *